(12) United States Patent
Irving et al.

(10) Patent No.: US 8,341,123 B2
(45) Date of Patent: Dec. 25, 2012

(54) EVENT STRUCTURED FILE SYSTEM (ESFS)

(75) Inventors: Graham Douglas Irving, Calgary (CA);
Robert Jeffrey Ellestad, Calgary (CA)

(73) Assignee: El Fresko Technologies Limited,
Calgary, Alberta (CA)

(*) Notice: Subject to any disclaimer, the term of this patent is extended or adjusted under 35 U.S.C. 154(b) by 0 days.

(21) Appl. No.: 11/627,267

(22) Filed: Jan. 25, 2007

(65) Prior Publication Data
US 2007/0198550 A1 Aug. 23, 2007

Related U.S. Application Data

(60) Provisional application No. 60/762,502, filed on Jan. 27, 2006.

(51) Int. Cl.
*G06F 17/00* (2006.01)
(52) U.S. Cl. .................. 707/648; 707/687; 707/697
(58) Field of Classification Search .................. 707/102, 707/1, 3, 10, 100, 640, 648, 687, 697, 736
See application file for complete search history.

(56) References Cited

U.S. PATENT DOCUMENTS

| | | | |
|---|---|---|---|
| 5,010,482 A * | 4/1991 | Keller et al. .................. 710/52 |
| 5,504,892 A * | 4/1996 | Atsatt et al. .................. 707/822 |
| 5,623,599 A * | 4/1997 | Shomler ...................... 714/18 |
| 6,189,016 B1 | 2/2001 | Cabrera et al. |
| 6,745,340 B1 * | 6/2004 | Liu et al. .......................... 714/5 |
| 7,293,033 B1 * | 11/2007 | Tormasov et al. ............ 707/101 |
| 7,584,338 B1 * | 9/2009 | Bricker et al. ................. 711/162 |
| 7,680,846 B2 * | 3/2010 | Shinkai ................. 707/999.205 |
| 2002/0176404 A1 * | 11/2002 | Girard ........................... 370/352 |
| 2003/0104479 A1 | 6/2003 | Bright et al. |
| 2003/0225835 A1 * | 12/2003 | Klien et al. ................... 709/205 |
| 2004/0107125 A1 * | 6/2004 | Guheen et al. ..................... 705/7 |
| 2004/0139018 A1 * | 7/2004 | Anderson et al. ............... 705/41 |
| 2005/0027757 A1 * | 2/2005 | Kiessig et al. ................ 707/204 |
| 2006/0004759 A1 | 1/2006 | Borthakur et al. |
| 2006/0129584 A1 * | 6/2006 | Hoang et al. .................. 707/101 |
| 2007/0073625 A1 * | 3/2007 | Shelton ........................... 705/59 |

FOREIGN PATENT DOCUMENTS

| | | |
|---|---|---|
| CN | 1289966 A | 4/2001 |
| EP | 1089176 A2 | 4/2001 |

OTHER PUBLICATIONS

Author: David Woodhouse, Title: JFFS : The Journalling Flash File System, Date: 2001, Link: http://www.ssrc.ucsc.edu/PaperArchive/woodhouse-ottawalinux01.pdf.*
Author: Stephen C. Tweedie, Title: Journaling the Linux ext2fs Filesystem, Date: LinuxExpo 1998, pp. 1-8.*

(Continued)

*Primary Examiner* — Greta Robinson
*Assistant Examiner* — Md. I Uddin
(74) *Attorney, Agent, or Firm* — Pillsbury Winthrop Shaw Pittman LLP

(57) ABSTRACT

A computer storage file system structured without the use of tables or indexes, instead using a sequence of a small but extensible number of predefined Event types in a logical sequence that describes the complete historical state and content of the file system, Events being actions taken upon objects, objects being at least a directory or a file, optionally with associated user data.

20 Claims, 2 Drawing Sheets

OTHER PUBLICATIONS

Author: Craig A.N. Soules, Garth R. Goodson, John D. Strunk, Gregory R. Ganger; Title: Metadata Efficiency in a Comprehensive Versioning File System; Date: May 2002; Pages: 32 pages.*

Rosenblum et al., "The Design and Implementation of a Log-Structured File System", University of California, Computer Sciences Division, Jul. 24, 1991, pp. 1-15.

Rosenblum et al., The Design and Implementation of a Log-Structure file System, ACM Transactions on Computer Systems, vol. 10, No. 1, Feb. 1992, pp. 26-52.

Chinese Office Action issued in Chinese Patent Application No. 2010050400410920, mailed on May 7, 2010, including English translation.

Gal et al., A Transactional Flash File System for Microcontrollers, Proceedings of the annual conference on USENIX Annual Technical Conference, Dec. 31, 2005, USENIX Association, Berkeley, California.

Supplementary European Search Report and Opinion for European Patent Application No. 07701720.0, mailed Jul. 20, 2010.

Seltzer et al., Journaling versus Soft Updates: Asynchronous Metadata Protection in File Systems, Proceedings of the USENIX Technical Conference, Jun. 18, 2000, pp. 71-84.

Douglis et al., Log-Structured File Systems, Intellectual Leverage, San Francisco, Feb. 27-Mar. 3, 1989, Computer Society International Conference (COMPCON), Washing ton, IEEE Computer Society Press, Conference 34.

* cited by examiner

EVENT STRUCTURED FILE SYSTEM (ESFS)

CROSS REFERENCE TO RELATED APPLICATIONS

The present application claims the benefit of priority of provisional application Ser. No. 60/762,502, filed Jan. 27, 2006, and is hereby incorporated in its entirety by reference.

FIELD OF THE INVENTION

The present invention relates generally to computers and file systems.

BACKGROUND OF THE INVENTION

Computer file systems have traditionally involved some mechanism of data storage at a physical location (for instance, a disk sector) and a lookup table or index of some sort identifying the data and its physical address (or a logical address from which that may be inferred). The tables are implemented in various forms, and generally require the ability to overwrite or update previous table entries as file system additions and changes occur. These approaches have the following disadvantages:
(a) there is a dependency on the file system to operate with specific storage media types (for example, rewritable)
(b) The file system is non-portable across different operating systems and media
(b) Only the current filesystem state is available. There is no inherent historical record of changes or additions.
(c) There are inefficiencies added when conventional file systems are extended to provide logging of changes.

Examples of table based file systems are the Unix File System (UFS) and its' associated directory tables and inodes, Windows FAT16, FAT32 ("File Allocation Table") file systems, and Windows NTFS, based on Master File Tables. Other file system designs extend existing file systems by adding journaling and logging to improve reliability and recoverability, and file versioning.

Computer file systems generally fall into the following classes:
1. "Inode" based with directory tables (Unix UFS, FFS, ext2/ext3)
2. File Allocation Table (FAT) based file systems (FAT16/FAT32, etc.)
3. Master File Table (MFT) based (Microsoft NTFS) using tables and index files to create metadata.
4. Journaling file systems (generally inode based, with separate journal)
5. Versioning file systems (VMS, OpenVMS, Cedar: table/inode like internal structures)
6. Log Structured file systems (LFS, Sprite LFS: UFS like internal structures and inode map tables written sequentially)

Implementations of all of the above file systems require the ability to update or overwrite previously written metadata tables and data areas on the media, and are reliant upon rewritable tables, indexes, or inode maps.

Master File Table (MFT) file systems such as NTFS from Microsoft, are heavily designed around the use of rewritable tables and indexes, which are maintained in specially allocated metadata files.

Journaling file systems are designed to improve reliability and recoverability after a crash or failure affecting the system. The journal component of such file systems records changes since a "checkpoint" or point in time at which the file system was known to be consistent, and to which it can be restored by reference to the recorded changes since "checkpoint". The journal component typically reuses space that was allocated to it, and is not integral to the file system itself, other than for the purpose of improving reliability. The journal's contents are generally limited to only those changes since the last checkpoint.

Versioning file systems maintain a file in its original form, and any subsequent changes are saved using the same file name and an incrementing version number. The number of historical versions available is generally limited and application or implementation dependent. The file's versions are generally implemented as "saves" of separate files with a naming convention for addressing specific different versions of the file in some sequence or order. These systems are generally implemented at a level closer to the user than the disk operating systems or low-level file systems to which this invention is directed.

Log-based file systems are perhaps the closest of the prior art to this invention. Sprite and LFS, as described in Mendel Rosenblum's and John K. Ousterhout's 24 July 1991 paper "The Design and Implementation of a Log-structured File System", published in the "*Proceedings of the 13$^{th}$ ACM Symposium on Operating System Principles*" and the February 1992 "*ACM Transactions on Computer Systems*", are typical of this family of file systems, and are generally implemented using internal structures that are patterned after a conventional table-based file system, such as UFS. The logging component records standard file system structures, such as inodes and directory entries, and adds a mapping table that describes the current location of all allocated inodes. The complete inode mapping table is then rewritten regularly to the end of the log, and is then used in a conventional manner to navigate the current file system structure.

It is, therefore, desirable to provide a computer file system which overcomes at least some of the deficiencies of the prior art systems or provides for added functionality not present in the prior art.

SUMMARY OF THE INVENTION

The present invention is a method implementing a file system without table-based metadata, using instead a list or sequence of predefined Event types to describe the state, content, and complete history of the file system. This is useful (among other uses) for implementing archival applications requiring secure, reliable and self-auditing, tamper-evident storage, and in particular for applications that require "write once read many" (WORM) behaviour for regulatory compliance in electronic storage systems. The system by design does not require overwriting of any previously written information, and may be implemented efficiently and consistently across all types of digital storage media, including WORM, erasable, rewritable, and tape.

Unlike a typical hierarchical file system, ESFS does not use any form of table within its' metadata to hold information describing the contents of the file system. Table-based systems are entirely distinct from ESFS, which uses incremental updates to a sequenced Event list to reflect changes as they occur, and does not require any form of internal table whatsoever. Instead of tables or indexes (e.g. File Allocation Tables or inodes of traditional file systems), ESFS uses a small set of predefined (but extensible) file system "Events". A single Event is a data structure that generally describes a single file system operation (e.g. file or directory creation, file write, or file close, etc.) and if applicable, the location of data related to the Event. Events are linked or related together into sequences using one or more "pointers" contained within the Event. Several pointer types are used to build and navigate the file system. By navigating the file system's structure using the pointers contained in the Event descriptions, one can perform all necessary tasks to operate a file system with features and operations equivalent to traditional hierarchical file systems.

Features of the Event Structured File System include:

Low file system overhead: A basic ESFS implementation is very simple. Overhead for storing the Events is minimal. There is no requirement to prepare media or pre-allocate storage space for Events.

Ideal for implementing WORM applications: ESFS records file system changes as incremental Events in the sequence they occur, without overwriting previously written data. ESFS is thus ideally suited for use with applications that require WORM behaviour or media.

Extensible Events: ESFS implementations can add custom Events types to add new features and controls.

Host independent: ESFS is designed to be independent of the host system and is well suited for removable media implementations.

Self-auditing: ESFS is self-contained, and requires no additional tables, indexes or data bases are required in order to access contents of the file system. ESFS Events can be used to audit and produce historical journals of the contents and state of the file system at any time since its' creation time.

Sequential or Random Access storage devices and media.

Adaptable to all media types: WORM, erasable media, rewritable, and pre-mastered.

Secure: Includes built-in tamper detection. ESFS can use both secure hash algorithms and encryption algorithms to ensure data integrity.

Built-in Versioning: ESFS tracks file and director versions, or revisions. This journal-like feature is built into the way Events are linked/related together, and reports can be inferred, generated or extracted.

Portability—file systems are binary compatible across all supported operating systems Small footprint—low overhead and resource requirements Fast—data can be archived at very near the rated speed of the underlying hardware Secure—ESFS provides mechanisms to detect tampering with file data or file system Metadata.

The EFSF may be briefly described as follows:

1. File system metadata, including one or more Events, linked together in a fashion to completely describe, in aggregate with all other Event descriptions, the entire contents and structure of the file system.
2. ESFS functionality or features can be extended by enhancing or increasing Event types to permit, for example, customization of the ESFS for a particular application, security model, or Operating System ("OS")
3. ESFS can be implemented independently of the host computing hardware, operating system, storage device, or media. Because of it
4. Because of its' inherent portability, ESFS is very well suited for removable media and archival applications.
5. ESFS has a small implementation "footprint", and the logic and structure of the system is easy to understand.

In prior art, file system implementations must make tradeoffs among media portability, media type, performance, security, verification, audit support, and robustness. It is an object of the present invention to obviate or mitigate at least one disadvantage of the previous art.

The ESFS of this invention may be consistently applied to all forms of erasable and write-once media, including physical devices and in-memory implementations. The benefits of the method seem significant, in particular in applications where "Write once read many" ("WORM") behaviors are useful or desirable or where the ability to authenticate the integrity of stored information is useful or desirable.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 2

DEFINITIONS

Figure 1:
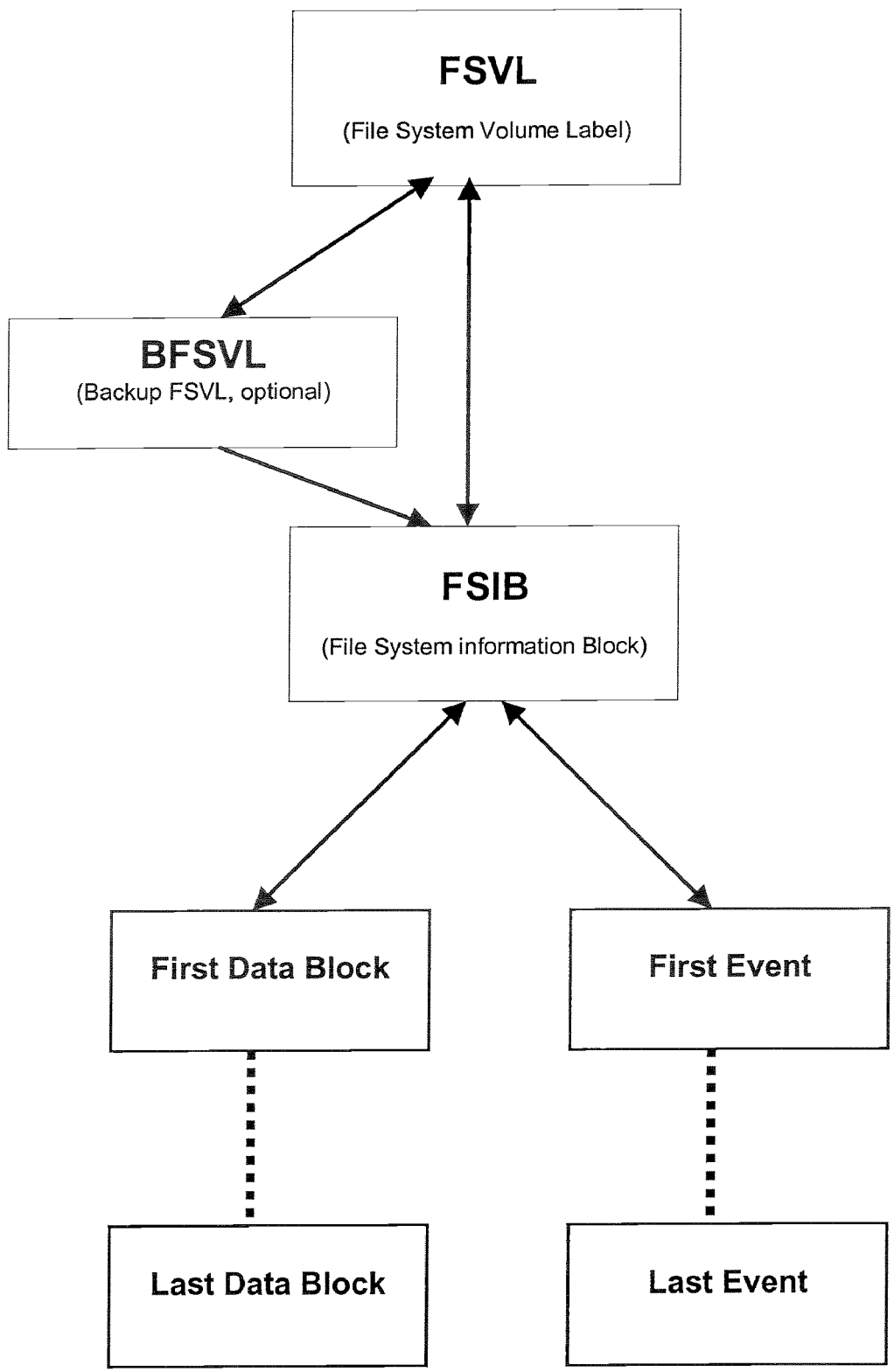
FIG. 1 is a block diagram showing the relationships among ESFS events.
Figure 2:
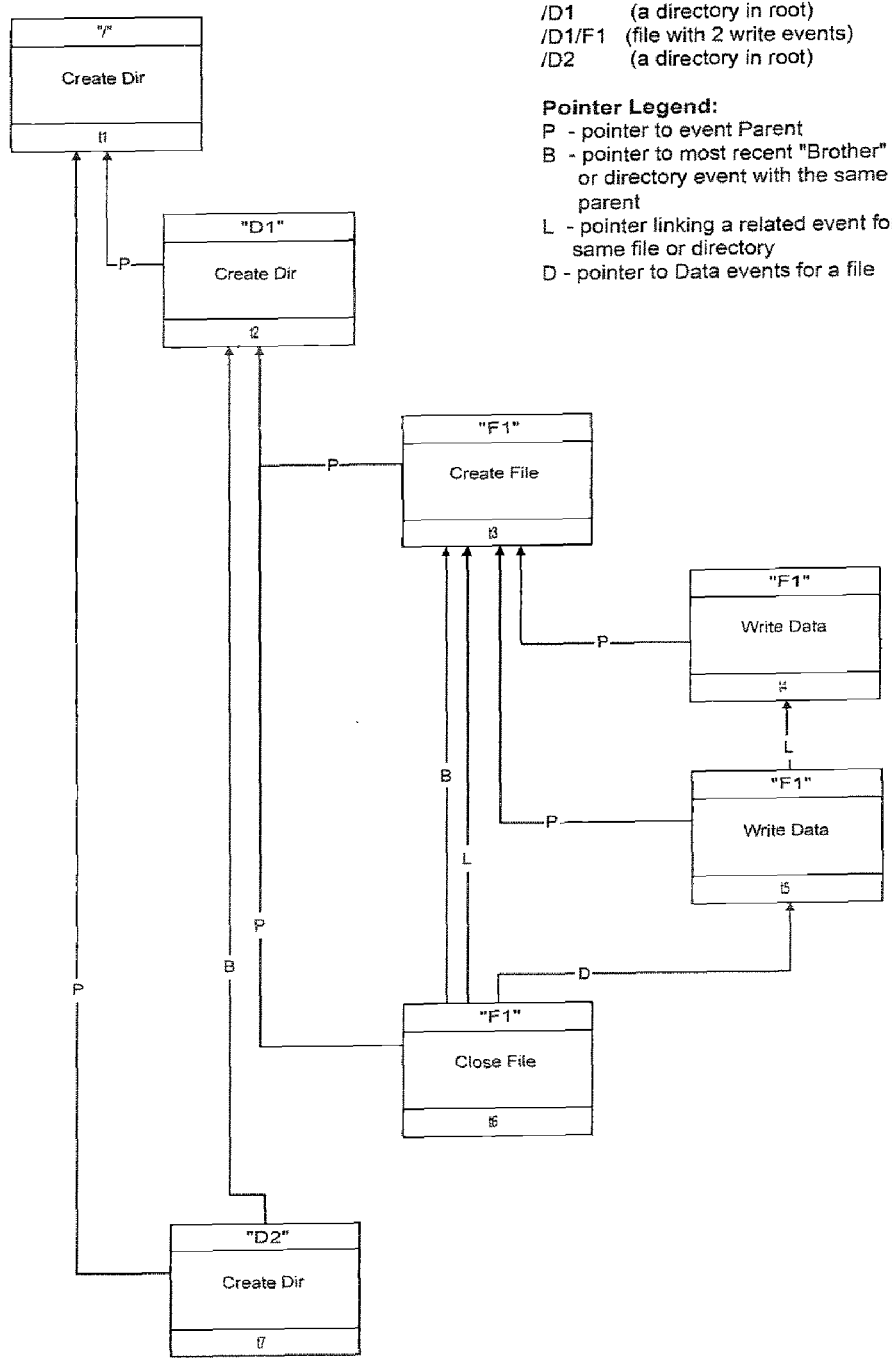
FIG. 2 is a block diagram showing the relationship between parts of an ESFS Volume Structure.

The Following Words have the Following Meanings Throughout

Block—the smallest unit of storage addressable by an ESFS file system.

Block Address—a unique location identifier used to access a Block.

Current Event—an Event referenced by a file system operation that is about to be performed.

Data—information of any kind that is to be written to the File system for possible future access and retrieval, and normally provided by an external source to the File system.

Directory—file system object that provides a way to name and organize multiple, related files. [For example, Users may perform the following file system operations on directories: Create, Delete, Rename, Get info and List Files.]

Endpoint—the most recent file or directory event location within a directory.

Event—a data structure recorded on a storage device associated with a specific change or addition to the File System.

Event Address—an Event Address specifies the location of a specific Event. It is comprised of a Block Address and a Block Offset, indicating the byte location of the Event within the Block.

File—a file system object that provides a way to store and recall data by name. Data within the file can be sequentially or randomly read and written. Users may, by example, perform the following file system operations: Create, Delete, Open, Close, Position, Read, Write, Rename, Set File Times, and Get Info.

File System—is a means within a computing environment to organize, store, process, retrieve and manage information/data using a storage medium of any type.

Metadata—file system information that holds information describing and relating the user file system objects, files and directories. In the context of ESFS, the list of Events for a file system are its metadata. Metadata is not directly accessible to users.

Object—an entity, such as a file or directory that exists within the File System.

Offset—the number of bytes from the beginning of a Block to the beginning of an Event.

Partition—a logical container with addressable Sectors that holds a file system, in whole or in part.

Pointer—an Event Address used to link Events into a list.

DETAILED DESCRIPTION

Generally, the present invention provides a File System comprising an ordered list of Events associated with Data, that may be implemented identically on all common digital storage media types, including, write-once, erasable, and rewritable media, whether in sequential or random-access mode, (or otherwise).

The system uses the sequence and type of Event with its associated Data without reference to any external table or journal entry to operate and be verifiable.

The system's list of Events is accessible in a predefined sequence, normally, but not limited to, reverse chronological order.

ESFS includes an ordered list of Events associated with Data made verifiable in whole or in part by provision of checksums and security information within the Events and data verification means.

ESFS may be efficiently implemented using a "Write Once Read Many" (WORM) model, irrespective of the underlying media type. Previously written areas of the media may be read, but are never overwritten or erased.

ESFS is made tamper-evident using checksums and security information on at least one of: Metadata and Data The method set out below describes how a file system may be structured and implemented using a small set of predefined set of Events, each of which describes an incremental change to the file system. The Events, such as creating or writing a file, form an ordered list that allows the exact state and contents of the file system to be known at any point in time. Events associated with a specific directory or file are logically linked as the file system grows. The method is unique and represents a fundamental change in the way computer file systems are constructed.

Current art typically uses tables and indexes that are overwritten, extended, or updated to reflect file system additions and updates. Additionally, file system implementations are generally specific to either magnetic or write-once media, and are not self-auditing.

Self-auditing means that the integrity of the file system (including the file system of this invention) can be assured without reference to an external or secondary information store, such as a journal or log file.

Using this invention's method, the list of Events and associated file data taken together are the file system and comprise its complete history since creation. No other information source is required either for normal use or for audit, integrity-checking, or tamper-evidencing.

Events stored within an ESFS file system are generally accessed sequentially and randomly using information within the Event to navigate to a desired location, but the specific means of providing such access is open to the ESFS implementer. For example, implementations that require write-once behaviour may achieve sequential access using reverse linked lists, while a rewritable implementation might use both forward and reverse linking. Thus, ESFS requires only the ability to read and write specific storage blocks on a physical or electronic medium using reference to a unique identifier or block number associated with the storage block.

For clarity in describing the method below, the most restrictive case will generally be used in this document: reverse linking using write-once media. Rewritable implementations would typically be a superset of the same Events and techniques, and other than additional implementation specific changes, still rely on the ability to sequentially access an Event list in a known order.

The method as described herein also demonstrates that all typical file system operations (creating, modifying, deleting files and directories) can be accomplished using a small set of predefined, ordered Events, without ever having to overwrite the storage media. It is also to be understood that time-ordered sequencing may not be the only sequence-ordering logic useful to computer file systems using Event sequence as the base data paradigm to provide a file system.

ESFS Features:

Features of the Event Structured File System include:

Low file system overhead: A basic ESFS implementation is very simple. Overhead for storing the Events is minimal. There is no requirement to prepare media or pre-allocate storage space for Events.

Ideal for implementing WORM applications: ESFS records file system changes as incremental Events in the sequence they occur, without overwriting previously written data. ESFS is thus ideally suited for use with applications that require WORM behaviour or media.

Extensible Events: ESFS implementations can add custom Events types to add new features and controls.

Host independent: ESFS is designed to be independent of the host system and is well suited for removable media implementations.

Self-auditing: ESFS is self-contained, and requires no additional tables, indexes or data bases are required in order to access contents of the file system.

Supports sequential or random access storage devices.

Supports both WORM and erasable media.

Secure: Includes built-in tamper detection. ESFS can use both secure hash algorithms and encryption algorithms to ensure data integrity.

Built-in Versioning: ESFS tracks file and director versions, or revisions. This journal-like feature is built into the way Events are linked/related together, and reports can be inferred, generated or extracted.

Portability—file systems are binary compatible across all supported operating systems Small footprint—low overhead and resource requirements Fast—data can be archived at very near the rated speed of the underlying hardware;

Secure—ESFS provides mechanisms to detect tampering with file data or file system Metadata.

Implementation Requirements

The ESFS concept is very flexible, and may be implemented on diverse hardware platforms, operating systems, and storage devices. Ignoring specific implementation issues, ESFS has the following minimum requirements for successful implementation and operation: a block addressable storage device.

Volume Structure

FIG. 1 is a volume structure diagram of a file system based on this ESFS. Components of the file system are:

File System Volume Label (FSVL): This item is optional and implementation dependent. It provides the host with a method of recognizing a specific ESF implementation on a storage medium.

File System Information Block (FSIB): This structure provides basic information describing the ESF file system, including volume size, geometry, and pointers to the logical addresses of the first Event and first data block. Depending on the implementation, the FSIB may also contain pointers to the logical address of the last Event and last data block.

Events: Individual data structures that are linked together by pointers. For write-once applications, Events are reversed linked together using one more types of pointers. Examples of Events: Create Directory, Create File, Write Data, Remove File, etc.

Data: logical blocks of file data; i.e., the contents of user files. The data blocks are pointed to by "Data Events".

Event Structured File System Operations:

The method for implementing core file system operations is described in detail in the following sections. The following operations are included:

Volume Creation—initializing storage medium with an empty, ready to use file system;

Volume Mounting—how to make an existing ESFS available for access and updating.

Volume Creation:
1. If required by the implementation, write a Volume Label, typically at block zero of the device.
2. Write a File System Information Block at a known Block offset on the storage medium.
3. Prepare the root directory Create. Directory Event.
4. If required by the implementation, initialize a Free Block List describing all available Blocks on the medium. Write the Free Block List to disk
5. Write an Unmount Event to disk.

Volume Recognition:
1. If required by the implementation, read the File system Volume Label (FSVL, typically Block zero) on the media. Perform validations to ensure it is a supported volume type and version.
2. Attempt to read an ESFS File System Information Block (FSIB) at an implementation specific known Block location.
3. Validate ESFS implementation specific identifiers and version numbers.

Volume Mounting:

To access or mount an ESFS volume, the following steps are normally taken:
1. If required by the implementation, read the File system Volume Label (FSVL).
2. Attempt to read an ESFS File System Information Block (FSIB) at an implementation specific known block location.
3. As a minimum, the FSIB will contain the necessary information to locate the first Event (First Event Address).
4. Using an implementation specific method, locate the last Event for the volume. A preferred method is to locate the last Event by performing a binary search of the file system area to locate ESFS blocks with identifiers that match the FSIB identifiers. The last Event should be an Unmount Event, indicating the last mount session was properly closed and that the basic file system's integrity is intact.
5. If the last Event is not an Unmount Event, FAIL the Volume Mount.
6. Implementations will typically persist information about a mounted volume in a structure that is referred to by subsequent file system functions.

ESFS Pathnames:

An ESFS pathname is a unique identifier assigned to a directory or file when it is created. After the file is created, the pathname can be used to access or update the directory or file. ESFS pathnames may be implementation specific. A common file system implementation is hierarchical, consisting of a top-level directory (the root directory), with zero or more file entries and subdirectory entries. Each file system entry below the root directory has a parent directory. Each file or directory entry has a unique name within its parent directory. Pathnames for a specific file consist of one or more directory components, each separated by a pathname delimiter (for example "f"), followed by a filename. To access a specific file, a complete or absolute pathname may be used to navigate through all parent directory levels until the last filename component is reached.

Events:

The structure and contents of a file system constructed using the method is described by an ordered list of Events. One or more Events are contained within a Block, where a Block consists of one or more physical storage Sectors. Each Block is addressable by a Block Address, and contains a unique signature that is associated with the volume's FSIB. A specific Event is addressable by an Event Address, which contains both a Block Address and byte offset of the Event within the specified Block.

There are several different types of Events, each describing a single change to the file system, such as creating a file or directory, or writing to a file. Individual Events may be linked together by Event pointers to associate related Events and easily navigate through the file system.

Event Types:

The system of this invention uses several Event types that are considered Core Events that would typically be used by most implementations to create directories and files. Also described are Extended Events that would provide additional file system functionality, such as renaming or deleting files and directories, if required for a specific implementation. Space Events can be used to implement storage management for allocation and reclaiming of Blocks as files are created, written to, or deleted.

ESFS Events are extensible, allowing the file system to easily grow and evolve while maintaining compatibility with earlier implementations. For example, "Security', Events could establish access control mechanisms for files and directories. "Quota" Events could establish space limits within directories. "Stream" Events could associate multiple types of data streams with a specific file.

| Event Type | Category | Description |
|---|---|---|
| Core Events | | |
| Create Directory | Directory | Create a directory |
| Create File | File | Creates a new file or a new version of an old file |
| Close File | File | Close a file |
| Write Data | File | Write data to a file (random or sequential) |
| Unmount | System | Denotes a successful unmount of the file system |
| Extended Events | | |
| Delete Directory | Directory | Remove a directory |
| Rename Directory | Directory | Rename a directory |
| Delete File | File | Delete a File |
| Rename File | File | Rename a File |
| Free Space Events | | |
| Allocate Block | System | Allocate a Block from the Free Block List |
| Release Block | System | Return an allocated block to the Free Block List |

Event Pointers:

| Number | Pointer Type | Structural information |
|---|---|---|
| 1 | Link | Links Events associated with a specific file or directory |
| 2 | Brother | Links file and directory Events associated with a particular directory |
| 3 | Parent | Links file and directory Events to a parent directory Event in a hierarchical directory structure |

Link Pointers: A link pointer is used to connect associated Events. That is, Events that are associated with one particular directory, file or list. The tables below express examples of possible connections among the Event types. For write-once implementations, link pointers will point to the last related Event (reverse linking), if one exists, otherwise it will be empty (nil). Rewritable implementations may choose reverse linking, forward linking, or both.

For clarity in describing the method, the most restrictive, case will be used: reverse linking and write-once media. Rewritable implementations would typically be a superset of the same Events and techniques, and other than additional implementation specific changes, still rely on the ability to sequentially access an Event list in a time-ordered manner.

The method as described herein also demonstrates that all typical file system operations can be accomplished using ordered Events, without ever having to overwrite existing information.

The three Event tables below are organized "From:" rows and "To:" columns. An Event in the "From:" column will point to an Event in the "To:" rows. For example: a Delete File Event may point to a Close File or Rename File Event; depending on which was the last to occur.

Events for a specific file may be related using Link and Parent pointers. Related events may include file renaming or file deletion events, for example.

Pointers for File Events
L = Link pointer, P = Parent pointer

| From: | To: the most recent file event for the same file | | | | |
|---|---|---|---|---|---|
| | Create File | Close File | Delete File | Data | Rename File |
| Create File | | $L^1$ | $L^2$ | | $L^3$ |
| Close File | L | L | | | |
| Delete File | | L | | | |
| Data | P | P | | L | |
| Rename File | | L | | | |

[1]Establishes link to a previous file revision
[2]Establishes link to a previous file version
[3]Establishes link from new file name to the old file name Directory Events are all linked to other related directory Events. A related directory Event will have the identical Name field in each ESF Name structure.

Pointers for Directory Events
L = Link pointer, P = Parent pointer

| From | To: the most recent event for the same directory | | |
|---|---|---|---|
| | Create Directory | Delete Directory | Rename Directory |
| Create Directory | $L^2$ | L | L |
| Delete Directory | L | | |
| rename Directory | L | | |

[2]Results in new directory version, if versions are supported by the implementation Brother Pointer:

A brother pointer points to the most recent file or directory Event that has the same parent directory.

Parent Pointer:

For file or directory events, a parent pointer points to the Create Directory Event of the parent directory, unless the parent directory is the root or top-level directory ("/"), in which case the parent pointer is empty (nil). For data events, a parent pointer points to a Close or Create Event, whichever is most recent.

ESFS Pathname Lookup:

ESFS Pathname Lookup is the process of navigating through the ESFS Events to locate the most recent file or directory Event associated with the pathname. It is a frequently used process, and as such, specific implementations would normally include caching mechanisms to boost performance for frequently accessed files and directories.

Each directory or file within ESFS has a unique pathname. In hierarchical implementation, the pathname is first split into one or more components, where each component is separated by a pathname delimiter. Each component is then used to determine the existence of the component name in the corresponding directory level.

Method:

The method for locating an entry in a hierarchical ESF file system is explained below. To assist in the explanation, the sample pathname "/dir01/myfiles/mydoc/doc1.txt" is used:

(a) Separate the pathname into components, where each component is a sequence of characters delimited by an implementation specific pathname delimiter character ("/" in the example), or the end of the string of characters, whichever comes first. The list of components is used below to navigate through the file system on directory level at a time (e.g. dir001, myfiles, mydoc, doc1.txt). The search begins in the root directory with the first component of the path, "dir001".

(b) Locate the most recent Event entry in the directory level being examined.

(c) If there are no file entries, then the pathname does not exist. The pathname terminates in failure.

(d) Examine the Event record for a match with the current component of the pathname.

(e) If the names do not match, then follow the brother link to locate the next associated entry in the directory. Go to c)

(f) The component and Event names match. If there are additional components, select the next (g) component name, and go to b)

(h) If the Event is a Close Event or a Create Directory Event, the search terminates in SUCCESS.

(i) If the Event is a Delete Directory, Rename Directory, Delete File, or Rename File Event, the search terminates in FAILURE.

ESFS Endpoint Lookup:

Because ESFS creates links among associated Events as the file system grows, access to the last entry in an Event list (or "endpoint") is a frequently executed process. Specific implementations may choose to incorporate an endpoint caching mechanism to reduce the time to access frequently referenced directories and add new Events.

Method:

The steps below assumes that ESFS Pathname lookup has already been performed, and the required Event Address is available:

(a) starting from the last written Event in the ESFS file system, traverse the Event list in reverse order until an Event is found having a matching parent Event Address (b) if a match is found, the most recent Event is the Endpoint Event Address. This address would typically be saved in an implementation specific endpoint cache.

(c) If a match is not found, the Endpoint Event is nil (empty)

ESF Block Events:

One of the common requirements of a file system is the management of storage space allocated to files and directories as they are created, updated, or deleted. Blocks must be allocated from a known list of available or free blocks (the Free Block List). The Free Block List must then be updated after each allocation or release of Blocks.

An implementation may use a simple Block allocation scheme that does not require Block Events at all. For example, Blocks could be allocated from a contiguous area, and the size of the area reduced after each allocation.

If the implementation requires more sophisticated space management, Block Events may be used for this purpose. In this case, Volume Creation would prepare a Free List Event through which all subsequent Block allocations would be accessed and tracked. For efficiency, a specific implementation need only generate and update a single Block Event as long as the allocations are contiguous, and Block Events need only be committed when the file system is being dismounted, just prior to writing an Unmount Event.

Three types of Block Events are described:

(i) Allocate Block Events are generated every time a Block is allocated to a file to hold data, and the Blocks are successfully written. However, since allocations tend to be contiguous in a Write Once storage model, only one Allocate Block Event is likely required for the duration of a mount session.

(ii) Free Block Events are normally created only when a write to a file fails, and the Blocks allocated to hold that write are then returned to the Free Block List.

(iii) Free List Events are written when the file system is dismounted, and contains a complete, updated list of contiguous free Block entries. When this list is empty, the file system is full.

While the specific method is implementation dependent, a method for managing Block Events and a Free Block List using reverse linked Events is described. For clarity, it is assumed that an ESFS file system has been created, and the most current Unmount Event has been established. The Unmount Event contains a pointer to the Free Block List and the Allocated Block List. The contents of each list are loaded into memory during the Volume Mount operation.

Allocate Block Method:

The purpose of this method is to allocate one or more Blocks from the Free Block List to a file that will write data to the allocated Blocks. The method is passed a parameter indicating the number of Blocks required, and if successful, returns a list of allocated blocks.

(a) For the purpose of this explanation, the Event specified by the Free Block List is the Current Event. Remaining Blocks is a value that is initialized to the number of blocks required.

(b) If the Free Block List is empty, or does not contain sufficient available blocks to satisfy the requested amount, FAIL the request.

(c) Create a new, empty Allocation Event. Set the brother pointer of this Event to point the previous Allocation Event, if any.

(d) Set the starting Block Address for the new Allocation Event to the starting address specified by the Current Event.

(e) If the Current Event contains sufficient Blocks to satisfy the remaining blocks for request:
  (i) set the number of blocks in the new Allocation Event to the total requested.
  (ii) add the number of blocks allocated to the starting address of the Current Event.
  (iii) go to g).

(f) The Current Event only partially satisfies the request:
  (i) set the total number of blocks in the new Allocation Event to the number available in the Current Event.
  (ii) Release any resources associated with the Current Event list item, and set Current Event to the next Event in the Free Block List.
  (iii) deduct the number of blocks allocated from Remaining Blocks.
  (iv) If the new Allocation Event is contiguous with the most recent System Allocated Block Event, then extend the size of the most recent System Allocated Block Event by the size of the current request.
  (v) Go to c).

(g) Set the Free Block List to Current Event.

(h) If the new Allocation Event is contiguous with the most recent System Allocated Block Event, then extend the size of the most recent System Allocated Block Event by the size of the current request. Otherwise, create a new System Allocated Block Event, and set the brother pointer to the previous System Allocated Block Event.

(i) The Allocated Event now contains a list of one or more contiguous Block areas.

(j) Return SUCCESS

Free Block Method:

If the implementation is such that blocks previously allocated to a file can be released or de-allocated, then this may be accomplished by creating a list of Block Events, one item for each contiguous area of Blocks, and inserting the list at the beginning of the Free Block List.

Directory Operations

Create Directory:

The method for creating a new directory in an ESF file system is explained below. A pathname for the new directory is provided by an external application to the file system, and the following steps are executed:

(a) perform ESFS Pathname Lookup on the specified directory pathname.

(b) if the pathname exists, then FAIL, the directory creation and exit the method (c) the pathname does not exist: continue by performing Endpoint Lookup for the parent directory of the new directory. Remember the Event Address of the parent directory.

(d) Create a new, empty Create Directory Event. Set the brother pointer of this Event to point to the endpoint located in c). Set the parent pointer of this Event from c). Copy the pathname component to the Event record.
(e) Commit the Event to the file system
(f) Done Rename Directory The method renaming an existing directory in an ESF file system is explained below. An external application provides the existing pathname, and the new pathname, and the following steps are then executed:
(a) perform ESFS Pathname lookup of the existing directory pathname.
(b) If the pathname does not exist, FAIL the rename operation
(c) If the pathname is NOT a directory, FAIL the rename operation
(d) The existing directory pathname is valid. Remember the Event Address of the Create Directory Event, and the Parent Event Address for the entry.
(e) Perform a pathname lookup of the new directory pathname
(f) If the pathname does exist, FAIL the rename operation
(g) Perform Endpoint Lookup in the parent directory, and remember the Event Address of the Endpoint Event entry.
(h) Create a new, empty Rename Directory Event
(i) Set the Link pointer to the Event Address of the Create Directory Event from d)
(j) Set the brother pointer to the Endpoint Event Address from g)
(k) Set the parent pointer to the Parent Event Address from d)
(l) Copy the last pathname component to the Rename Directory Event
(m) Create a new, empty Create Directory Event
(n) Commit the Event to the file system, remember the Event Address of the new Event.
(o) Set the Link pointer to the Event Address from n)
(p) Set the Brother pointer to the Event Address from n)
(q) Set Parent pointer to the Parent Event address from d)
(r) Commit the Event to the file system
(s) Done Delete Directory (a) perform EFS Pathname Lookup on the specified directory pathname,
(b) if the pathname does not exist, then FAIL the directory deletion
(c) The directory exists: if the Event found is a Delete Directory or Rename Event, then FAIL the directory deletion.
(d) Perform Endpoint Lookup for the specified directory. If the directory is not empty (an Endpoint exists), then FAIL the directory deletion.
(e) The directory exists, it is active, and it is empty: create a new, empty Delete Directory Event.
(f) Set the brother pointer of this Event to point to the Endpoint Event Address located in d).
(g) Set the parent pointer of this Event from d).
(h) Copy the pathname component to the Event record.
(i) Commit the Event to the file system
(j) Done File Operations Create File (Create a New File)

The method for creating a new file in a MWSF file system is explained below. A pathname for the new file is provided by an external application to the file system, and the following steps are executed:
(a) perform ESFS Pathname Lookup on the specified file pathname.
(b) If the pathname already exists, FAIL the file creation
(c) perform Endpoint Lookup for the parent directory of the new file. Remember the Event Address of the parent directory.
(d) Create a new, empty Create File Event.
(e) Set the brother pointer of this Event to point to the Endpoint Event Address located in c).
(f) Set the parent pointer of this Event from c).
(g) Copy the pathname component to the Event record.
(h) Commit the Event to the file system
(i) Done Open File (Open an Existing File)

The method for opening an existing file is explained below. A pathname for the new file is provided by an external application to the file system, and the following steps are executed:
(j) Perform ESFS Pathname lookup on the specified file pathname.
(k) If the pathname does not exist, FAIL the operation.
(l) If the last Event found for the pathname is not a Close File Event, FAIL the operation.
(m) Remember the Event Address for Close File Event.
(n) Perform Endpoint Lookup for the parent directory of the new file. Remember the Event Address of the parent directory.
(o) Done Rename File The method renaming an existing file in an ESFS file system is explained below:

An external application provides the existing pathname of the file to be renamed, a new pathname, and the following steps are then executed:
(a) perform ESFS Pathname Lookup of the existing file pathname.
(b) If the pathname does not exist, FAIL the rename operation
(c) If the pathname is NOT a file, FAIL the rename operation
(d) Remember the Event Address of the Close File Event, and the Parent Event Address for the entry.
(e) Perform a pathname lookup of the new file pathname
(f) If the pathname DOES exist, FAIL the rename operation
(g) Perform Endpoint Lookup in the parent directory of the file, and remember the Event Address of the Endpoint Event entry.
(h) Create a new, empty Rename File Event
(i) Set the Link pointer to the Event Address of the Close File Event from d)
(j) Set the brother pointer to the Endpoint Event Address from g)
(k) Set the parent pointer to the Parent Event Address from d)
(l) Copy the last pathname component to the Rename File Event
(m) Create a new, empty Create File Event
(n) Commit the Event to the file system, remember the Event Address of the new Event.
(o) Set the Link pointer to the Event Address from n)
(p) Set the Brother pointer to the Event Address from n)
(q) Set Parent pointer to the Parent Event Address from d)

(r) Commit the Event to the file system
(s) Done

Delete File
(a) perform ESFS Pathname Lookup on the specified directory pathname
(b) if the pathname does not exist, then FAIL the deletion and exit the procedure.
(c) if the last Event found for the pathname is a Delete File or Rename Event, then FAIL the file deletion and exit the procedure.
(d) create a new, empty Delete File Event.
(e) Set the brother pointer of this Event to point to the Endpoint Event Address located in c).
(f) Set the parent pointer of this Event from c).
(g) Copy the pathname component to the Event record.
(h) Commit the Event to the file system
(i) Done Write File The method for writing data to a file in the ESFS file system is explained below. A specific implementation of the method would normally use a file descriptor or handle that provides access to a structure that retains information for an associated file that has been created or opened by the Create File or Open File methods.

The Write File method assumes that the following information is available:
 (i) a file descriptor providing access to the file to which data will be written
 (ii) a memory buffer containing the data to be written (Data)
 (iii) the length of the data to be written (Data-Length)
 (iv) the starting offset within the file (File-Offset) at which writing is to commence (for sequential writing, the location can be retained by the file descriptor and updated automatically after each successful Write File)
(a) from the file descriptor, get the Event Address of the files' most recent file Event (a Create File or Close File Event). This address is the File-Event-Address.
(b) set Parent-Event-Address to match parent specified in the most recent write Event.
(c) find the most recent Data Event for the specified file. This address is Data_Event_Address.
(d) perform the Allocate Block method, specifying Data-Length number of Blocks.
(e) If successful, a list of one or more areas of contiguous Blocks will be returned (Allocated-Block-List) that is sufficient to contain Data.
(f) If the requested number of blocks cannot be allocated, FAIL the Write operation and exit the procedure.
(g) set Current-File-Offset to File-Offset.
(h) For each entry in Allocated-Block-List:
 (i) Current-Allocated-Block refers to the current entry in Allocated-Block-List.
 (ii) create a new, empty Data Event record (Current-Write-Event)
 (iii) set the Parent pointer to the Parent-Block-Address from a)
 (iv) set the Brother pointer to the File-Event-Block-Address from a).
 (v) set the Link pointer to the Write_Event_Block_Address from b).
 (vi) set the Event Address in Current-Write-Event to the starting Event Address specified in Current-Allocated-Block.
 (vii) set the length in Current-Write-Event to the length specified in Current-Allocated-Block.
 (viii) set the File Offset in Current-Write-Event to Current-File-Offset
 (ix) write Data to the media, starting at Current-File-Offset, and continuing for Current-Write-Length.
 (x) commit Current-Write-Event to the file system
 (xi) add Current-Write-Length to Current-File-Offset
 (xii) select the next entry in Allocated-Block-List
(i) Done Read File The method for reading data from a file in the ESFS file system is explained below. The specific implementation of the method would normally include a file descriptor that retains information concerning a file that has been created or opened by the Create File or Open File methods. Also, specific implementations may support reading at any file location and length, or restrict reading to locations and sizes that are multiples of the underlying Block size.

The Read File method described below assumes that the following information is available:
 (i) a file descriptor providing access to the file to which data will be written
 (ii) a memory buffer into which the data from the file will be transferred (Data)
 (iii) the length of the data to be read (Data-Length)
 (iv) the starting offset in bytes (File-Offset) from which reading is to commence (for sequential reading, this location can be retained by the file descriptor and updated automatically after each successful Read File)

Since the specified File-Offset may not fall on an even Block boundary, implementations may need to perform the first (and/or last) read operation using a temporary buffer to accept a full Block. Partial user data is then copied to Data from a calculated offset within the temporary buffer.

(a) if Data-Length is zero, return SUCCESS.
(b) Otherwise, perform the following initialization steps:
 (i) set File_Event_Address to the Event Address designated in the file descriptor. This is the most recent file Event for the file. Read the File Event.
 (ii) If the File Event is a Create File Event, then the file is empty. FAIL the read and exit the process.
 (iii) If the File Event is a Close File Event, then the Link pointer will point to the most recent Data Event for the file. Set Write-Event-Address to the Link pointer.
 (iv) set Parent-Event-Address to the one specified in the file Event.
 (v) initialize Current-File-Offset to File-Offset.
 (vi) Initialize Remaining_Data_Length to Data_Length
(c) Starting from Data_Event_Address, traverse the Data Event List until an Event is found that contains the Current-File-Offset. This will be referred to as Current-Data-Event.
(d) If such an Event is not found, FAIL the Read File operation, and exit the process.
(e) Next, since Current_Data_Event can specify many Blocks, determine the first Event Address for reading data as follows:
First_Block_Address=StartingAddress from Data Event
Block_Offset=Current_File_Offset−Data_Event_File_Offset
If Block_Offset is not a multiple of Block Size, then use a temporary buffer (Buffer) when transferring data, and read one Block, starting at:
Read_Address=First-Block-Address+(Block_Offset/Block Size)
Read the specified Block into Buffer, and copy from the Current-File_Offset. This value is the Block-Offset, and the first Block to read is Starting_Block_Address+(Block-Offset Block-Size).

(f) set Read-Length to the lesser of Remaining_Data_Length or (Write-Event-Length−Block-Offset)

(g) exit the procedure.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. In a computing environment, a method for unambiguously describing and authenticating file system contents and historical actions by implementing a self-auditing file system for an associated storage device, the method comprising:

maintaining, on the storage device, file system metadata comprising an ordered list of Events chosen from an extensible list of multiple Event types, each Event type being a data structure within the file system describing at least a specific unambiguous action in a sequence of actions taken upon an object and wherein the ordered list of Events unambiguously describes the sequence of actions taken upon the object, wherein an addition of a new Event type to the list of Event types does not impact previously written metadata, and wherein each Event in the ordered list is associated with a single unambiguous action taken upon an Object; and in response to each new action taken upon any Object, appending a new linked Event in the ordered list of Events in the file system metadata corresponding to the action;

wherein the ordered list of Events comprising the file system metadata unambiguously describes each historical action and each incremental change to a state of the file system and previously created file system metadata is not obsoleted or impacted, wherein logical order of the list of Events is maintained by at least a pointer, without requiring use of an external table or an index, wherein the ordered list of Events is authoritative metadata of file system state, content, and history of the file system and each Event within the ordered list of Events is a permanent contributor to the authoritative metadata for a life of the file system, and wherein the ordered list of Events and associated data of the self-auditing file system can be authenticated and audited by reading and authenticating the ordered list of Events in chronological order of their occurrence as inserted.

2. The method of claim 1, where the Objects are entities which comprise one or more of:

a file, a directory, a symbolic link to another file or directory, an extension or change to the file system itself, or an informational notice.

3. The method of claim 1, wherein the associated storage device comprises media which is one of: write-once, erasable, re-writable, mastered or a hybrid of two or more of these media types.

4. The method of claim 1, wherein an incremental change of the state of the file system, includes a change to a data, metadata, a checksum, integrity status, a security setting, or an open or closed state of a file.

5. The method of claim 1, wherein the list of Event types is extensible and includes: (i) create a directory; (ii) rename a directory.

6. The method of claim 5, wherein the list of Event types further includes: (iii) rename a file; (iv) delete a file; and (v) delete a directory.

7. The method of claim 1, wherein the action taken upon the Object (i) affects data within a file in the file system, or (ii) describes access to or state changes of a file within the system.

8. The method of claim 1, wherein the set of Events is extensible to support added file system functionality, and Events include one or more descriptions of operations including at least one selected from the group consisting of: access or change file data, open or close a file, and change directory or file attributes.

9. The method of claim 8, wherein the file attributes include at least one selected from the group consisting of: a file name, user name, security settings, file creation, access and modification times.

10. The method of claim 1, wherein the list of Event types includes at least a Create File Event and a Write File Event associated with user data.

11. The method of claim 1, wherein user data associated with each Write Event is permanently retained by the file system.

12. The method of claim 1, further comprising:
performing file system Object versioning comprising:
producing an Object version by applying all of the Events for an Object of interest in order up from that Object's first creation to an endpoint associated with a version of interest of that Object.

13. The method of claim 1, wherein the extensible list of multiple Event types includes both Events describing active actions to the file system contents and passive, read-only actions that represent an action or access to the file system contents without a corresponding change in file system contents.

14. The method of claim 1, further comprising:
performing file system Object versioning comprising:
applying all of the Events for an Object of interest in order from that Object's first creation to an endpoint associated with a version of interest of that Object, the order being maintained by at least a pointer and without requiring use of a table or an index.

15. The method of claim 1, wherein at least one of the Events is associated with user data.

16. A non-transitory computer-readable medium comprising computer-readable instructions stored therein that when executed by a processor are configured to implement an event structured file system (ESFS) for managing Objects on a storage device in a computing environment, the instructions comprising:

file system metadata comprising an ordered list of Events that describes a file system operation selected from a predefined, extensible list of Event types, each Event type being a data structure within the file system describing at least a specific unambiguous action in a sequence of actions taken upon on Object and wherein the ordered list of Events unambiguously describes the sequence of actions taken upon the object, wherein an addition of a new Event type to the list of Event types does not impact previously written metadata;

wherein each Event in the ordered list of Events is maintained in order by at least one pointer, without requiring use of an external table or an index, each Event being associated with a single unambiguous action taken upon an Object, and in response to each new action taken upon each Object, new file system metadata is created corresponding to the action, such that the ordered list of Events provides an unambiguous, authoritative, historical description of incremental changes to a state of the file system and previously created file system metadata is not obsoleted, such that each Object managed on the ESFS is self-auditable by reading and authenticating the ordered list of Events in order of their occurrence as inserted, wherein the ordered list of Events comprising the file system metadata is an authoritative source of file system state, content, and history of the file system and each Event within the ordered list of Events is a permanent contributor to the authoritative metadata for a life of the file system, and wherein an addition of a new linked Event to the ordered list of Events does not break compatibility with prior versions of the list of Events.

17. The medium and instructions of claim 16, further comprising:

pointers linking an Event to one or more existing Events.

18. The medium and instructions of claim 16, wherein the Objects are entities which comprise one or more of:

a file, a directory, a symbolic link to another file or directory, an extension or change to the file system itself, or an informational notice.

19. The medium and instructions of claim 16, wherein an incremental change of the state of the file system includes a change to a data, metadata, checksum, integrity status, security setting, or open or closed state of a file.

20. The medium and instructions of claim 16, wherein the action taken upon the Object (i) affects data within a file in the file system, or (ii) describes access to or state changes of a file within the system.

* * * * *